(12) United States Patent
Liu et al.

(10) Patent No.: US 8,048,198 B2
(45) Date of Patent: Nov. 1, 2011

(54) HIGH PERFORMANCE MIXED MATRIX MEMBRANES INCORPORATING AT LEAST TWO KINDS OF MOLECULAR SIEVES

(75) Inventors: Chunqing Liu, Schaumburg, IL (US); David A. Lesch, Hoffman Estates, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 517 days.

(21) Appl. No.: 11/936,951

(22) Filed: Nov. 8, 2007

(65) Prior Publication Data

US 2009/0120875 A1 May 14, 2009

(51) Int. Cl.
- *B01D 53/22* (2006.01)
- *B01D 61/00* (2006.01)
- *B01D 71/02* (2006.01)
- *B01D 71/06* (2006.01)

(52) U.S. Cl. ............ 95/45; 95/47; 95/50; 95/51; 95/54; 95/55; 96/4; 96/8; 96/9; 96/10; 96/11; 96/12; 96/14; 210/640; 210/641; 210/500.27; 210/502.1; 502/4; 502/64

(58) Field of Classification Search .................... 96/4, 7, 96/8, 9, 10, 11, 12, 14; 95/45, 47, 50, 51, 95/54, 55; 210/640, 641, 650, 500.27, 502.1, 210/506; 502/4, 64

See application file for complete search history.

(56) References Cited

U.S. PATENT DOCUMENTS

| | | | |
|---|---|---|---|
| 4,822,492 A | 4/1989 | Chao et al. | |
| 6,368,382 B1 * | 4/2002 | Chiou | 95/49 |
| 6,500,233 B1 * | 12/2002 | Miller et al. | 95/50 |
| 6,508,860 B1 * | 1/2003 | Kulkarni et al. | 95/51 |
| 6,626,980 B2 | 9/2003 | Hasse et al. | 95/51 |
| 6,755,900 B2 * | 6/2004 | Koros et al. | 96/10 |
| 6,896,717 B2 * | 5/2005 | Pinnau et al. | 95/51 |
| 7,109,140 B2 | 9/2006 | Marand et al. | 502/4 |
| 7,138,006 B2 | 11/2006 | Miller et al. | 95/45 |
| 7,166,146 B2 | 1/2007 | Miller et al. | 95/45 |
| 2005/0268782 A1 | 12/2005 | Kulkarni et al. | 96/4 |
| 2006/0107830 A1 * | 5/2006 | Miller et al. | 95/45 |
| 2006/0117949 A1 | 6/2006 | Kulkarni et al. | 95/45 |
| 2006/0175249 A1 * | 8/2006 | Vane et al. | 210/502.1 |
| 2007/0022877 A1 | 2/2007 | Marand et al. | 95/51 |
| 2008/0142440 A1 | 6/2008 | Liu et al. | |

OTHER PUBLICATIONS

U.S. Appl. No. 11/954,017 filed Dec. 11, 2007, Liu.
Office Action dated Feb. 23, 2009 in U.S. Appl. No. 11/954,017, Liu.
Applicants' May 26, 2009 Response to the Feb. 23, 2009 Office Action in U.S. Appl. No. 11/954,017, Liu.
U.S. Appl. No. 11/940,539, filed Nov. 15, 2007, Liu.
Office Action dated Jun. 11, 2009 in U.S. Appl. No. 11/940,539, Liu.
U.S. Appl. No. 11/612,366, filed Dec. 18, 2006, Liu.

* cited by examiner

*Primary Examiner* — Jason M Greene
(74) *Attorney, Agent, or Firm* — Mark Goldberg

(57) ABSTRACT

The present invention discloses a new type of high performance mixed matrix membranes (MMMs) and methods for making and using the same. The MMMs comprise a continuous polymer matrix and at least two types of molecular sieves dispersed therein. The continuous polymer matrix in the MMM contains at least one type of polymer. The MMM in the form of a dense film, asymmetric flat sheet membrane or otherwise prepared exhibits simultaneously improved selectivity and permeability for gas separations compared to polymer membranes made from a continuous polymer matrix without any molecular sieves or with only one type of molecular sieve. MMMs of the present invention are suitable for a wide range of gas, vapor, and liquid separations such as alcohol/water, $CO_2/CH_4$, $H_2/CH_4$, $O_2/N_2$, $CO_2/N_2$, olefin/paraffin, iso/normal paraffins, and other light gases separations.

19 Claims, No Drawings

HIGH PERFORMANCE MIXED MATRIX MEMBRANES INCORPORATING AT LEAST TWO KINDS OF MOLECULAR SIEVES

BACKGROUND OF THE INVENTION

This invention pertains to high performance mixed matrix membranes (MMMs). More particularly, the invention pertains to a new type of high performance MMMs incorporating at least two kinds of molecular sieves and methods for making and using the same.

Gas separation processes using membranes have undergone a major evolution since the introduction of the first membrane-based industrial hydrogen separation process about two decades ago. The design of new materials and efficient methods will further advance the membrane gas separation processes within the next decade.

The gas transport properties of many glassy and rubbery polymers have been measured, driven by the search for materials with high permeability and high selectivity for potential use as gas separation membranes. Unfortunately, a key limitation in the development of new membranes for gas separation applications is a well-known trade-off between permeability and selectivity of polymers. By comparing the data of hundreds of different polymers, Robeson demonstrated that selectivity and permeability seemed to be inseparably linked to one another, in a relation where selectivity increases as permeability decreases and vice versa.

Despite concentrated efforts to tailor polymer structure to improve separation properties, current polymeric membrane materials have seemingly reached a limit in the tradeoff between productivity and selectivity. For example, many polyimide and polyetherimide glassy polymers such as Ultem 1000 have much higher intrinsic $CO_2/CH_4$ selectivities ($\alpha_{CO2/CH4}$) (~30 at 50° C. and 690 kPa pure gas tests) than that of cellulose acetate (~22), which are more attractive for practical gas separation applications. However, these polyimide and polyetherimide glassy polymers do not have permeabilities that are attractive for commercialization compared to current commercial cellulose acetate membrane products. There are some inorganic membranes, such as zeolite and carbon molecular sieve membranes that offer much higher permeability and selectivity than the polymeric membranes, but are expensive and difficult for large-scale manufacture. Therefore, it remains highly desirable to provide an alternative cost-effective membrane that combines high permeability and selectivity.

Based on the need for a more efficient membrane than the polymer or the inorganic membranes, a new type of membranes, mixed matrix membranes (MMMs), has been developed. MMMs are hybrid membranes containing inorganic fillers such as molecular sieves embedded in a polymer matrix.

MMMs have the potential to achieve higher selectivity with equal or greater permeability compared to existing polymer membranes, while maintaining their advantages. Much of the research conducted to date on MMMs has focused on the combination of a dispersed solid molecular sieving phase such as molecular sieves with an easily processable continuous polymer matrix. For example, see U.S. Pat. No. 6,626,980; US 2005/0268782; US 2007/0022877 and U.S. Pat. No. 7,166,146.

Many organic polymers, including cellulose acetate, polyvinyl acetate, polyetherimide (commercially Ultem®), polysulfone (commercially Udel®), polydimethylsiloxane, polyethersulfone, and several polyimides (including commercial Matrimid®), have been used as the continuous phase in MMMs. Typical inorganic sieving phases in MMMs include various molecular sieves, carbon molecular sieves, and silica. The sieving phase in a solid/polymer mixed matrix scenario can have a selectivity that is significantly higher than the pure polymer. Addition of a small volume fraction of sieves to the polymer matrix, therefore, can increase the overall selectivity significantly.

In recent years, significant research effort has been focused on materials compatibility and adhesion at the inorganic molecular sieve/polymer interface in order to achieve separation property enhancements over traditional polymers with MMMs. For example, Kulkarni et al. and Marand et al. reported the use of organosilicon coupling agent functionalized molecular sieves to improve the adhesion at the sieve particle/polymer interface of the MMMs. See U.S. Pat. Nos. 6,508,860 and 7,109,140. This method, however, has a number of drawbacks including prohibitively expensive organosilicon coupling agents and very complicated time consuming molecular sieve purification and organosilicon coupling agent recovery procedures after functionalization. Therefore, the cost of making such MMMs having organosilicon coupling agent functionalized molecular sieves in a commercially viable scale can be very expensive. Most recently, Kulkarni et al. also reported the formation of MMMs with minimal macrovoids and defects by using electrostatically stabilized suspensions. See US 2006/0117949. U.S. Pat. No. 7,138,006 to Miller et al., entitled "Mixed matrix membranes with low silica-to-alumina ratio molecular sieves and methods for making and using the membranes", reports the incorporation of low silica-to-alumina (Si/Al) ratio molecular sieves into a polymer membrane with a Si/Al molar ratio of the molecular sieves preferably less than 1.0. Miller et al. claim that when the low Si/Al ratio molecular sieves are properly interspersed with a continuous polymer matrix, the MMM ideally will exhibit improved gas separation performance even without functionalizing the surface of the molecular sieves using organosilicon coupling agent.

Despite all the research efforts, only a few MMMs comprising a continuous polymer matrix and a molecular sieve dispersed therein reported in the literature showed simultaneous enhanced selectivity and permeability for gas separations compared to a corresponding polymer membranes made from the continuous polymer without the molecular sieve. Most of the MMMs exhibited either selectivity improvement with decreased permeability or enhanced permeability without selectivity improvement compared to a corresponding polymer membrane made from the continuous polymer. In high-performance membranes, both high permeability and high selectivity are desirable because higher permeability decreases the size of the membrane area required to treat a given amount of feed, thereby decreasing the capital cost of membrane units, and because higher selectivity results in a higher purity product. While in some cases the polymer "upper-bound" curve has been surpassed using MMMs, it is still highly desirable to provide a new type of MMM that can yield a combination of higher permeability and selectivity over conventional polymer membranes for a variety of applications particularly for gas separations. Huge markets would exist for high volume gas separation membranes if more robust and higher selectivity and permeability MMMs were economically available.

SUMMARY OF THE INVENTION

This invention pertains to high performance mixed matrix membranes (MMMs). More particularly, the invention pertains to a new type of high performance MMMs incorporating at least two types of molecular sieves and methods for making and using the same. The MMMs described herein comprise a continuous polymer matrix and at least two kinds of molecular sieves dispersed therein. The continuous polymer matrix in the MMM contains one or more types of polymers. The MMM is prepared from a concentrated suspension (or so-called "casting dope") containing at least two types of molecular sieves as the dispersed fillers and one or two or more types of polymers as a continuous polymer matrix.

A method for making these MMMs comprises first dispersing at least two kinds of molecular sieve particles in one or more solvents to form a slurry, then dissolving a first type of polymer in the slurry and then dissolving a second type of polymer in the slurry to form a concentrated suspension. Then a MMM is fabricated as a dense film, an asymmetric flat sheet, thin-film composite (TFC), or hollow fiber using the concentrated suspension which should be bubble free. In some cases a membrane post-treatment step can be added to improve selectivity provided that it does not change or damage the membrane, or cause the membrane to lose performance with time. The membrane post-treatment step can involve coating the top surface of the MMM with a thin layer of material such as a polysiloxane, a thermally curable silicone rubber, a fluoro-based polymer, or a radiation curable silicone to fill the surface voids and defects on the MMM.

The incorporation of two or more kinds of molecular sieve fillers into the continuous polymer matrix yields a combination of higher permeability and higher selectivity over conventional polymer membranes for a variety of applications and particularly for gas separations. Generally, one of the molecular sieve fillers primarily improves the selectivity of the continuous polymer matrix (or enhances both selectivity and permeability) and the other type of molecular sieve filler primarily improves the permeability of the continuous polymer matrix (or enhances both selectivity and permeability). Therefore, the MMMs containing two types of molecular sieve fillers exhibit both enhanced selectivity and permeability for separations compared to the polymer membranes made from the continuous polymer matrix that do not contain such molecular sieve fillers. In some embodiments of the present invention, the two types of molecular sieves have different sizes of pores so that one type of molecular sieve enhances permeability and the other type of molecular sieve enhances selectivity. Addition of a small weight percent of two types of molecular sieves to the polymer matrix has been found to significantly increase the overall separation efficiency and productivity to a level that is unexpected based upon the addition of just one type of molecular sieve.

The molecular sieves used in the MMMs include microporous and mesoporous molecular sieves, carbon molecular sieves, and porous metal-organic frameworks (MOFs). Preferably, one of the molecular sieves used in the MMMs is a microporous molecular sieve such as pure silicate molecular sieves such as Si-DDR; alumino-phosphate molecular sieves including AlPO-14 and AlPO-53; aluminosilicate molecular sieves including UZM-5 and UZM-25. Preferably, the second molecular sieve is selected from mesoporous molecular sieves such as MCM-41, MCM-48, and SBA-15, carbon molecular sieves, MOFs, or microporous molecular sieves such as pure silicate molecular sieves including Si-DDR; alumino-phosphate molecular sieves including AlPO-18, AlPO-5 and AlPO-17; aluminosilicate molecular sieves including 4A, 5A, SSZ-13, SSZ-62 and UZM-9; or silico-alumino-phosphate molecular sieves including SAPO-34. More preferably, the two types of molecular sieves are two different nano-sized (5-1000 nm particle size) small pore microporous molecular sieves and having a largest minor crystallographic free diameter of 3.8 angstroms or less such as AlPO-14 and AlPO-18 in one MMM, AlPO-14 and SAPO-34 in one MMM, AlPO-14 and UZM-5 in one MMM, or Si-DDR and AlPO-18 in one MMM.

These MMMs combine the solution-diffusion mechanism of polymer membranes and the molecular sieving and surface sorption mechanism of molecular sieves. These MMMs, particularly in the form of dense film, asymmetric flat sheet, thin-film composite, or hollow fiber exhibit significantly enhanced selectivity and permeability over polymer membranes prepared from the continuous polymer matrix. The method of the current invention is suitable for large scale membrane production and can be integrated into a commercial polymer membrane manufacturing process.

These MMMs can be used for separating at least one gas from a mixture of gases. This process comprises providing a mixed matrix gas separation membrane comprising at least two kinds of molecular sieve filler materials uniformly dispersed in a continuous polymer matrix phase consisting essentially of at least one polymer which is permeable to at least one gas. Then the mixture of gases is contacted on one side of the MMM to cause this at least one gas to permeate the MMM and this at least one gas is removed from the opposite side of the membrane as a permeate gas composition comprising a portion of this at least one gas.

MMMs of the present invention are suitable for a variety of gas, vapor, and liquid separations, and particularly suitable for gas and vapor separations such as separations of $CO_2$/$CH_4$, $H_2$/$CH_4$, $O_2$/$N_2$, $CO_2$/$N_2$, olefin/paraffin, and iso/normal paraffins.

DETAILED DESCRIPTION OF THE INVENTION

Mixed matrix membranes containing molecular sieve materials as dispersed fillers may retain polymer processability and exhibit improved selectivity, permeability or both for separations due to superior molecular sieving and sorption properties of the molecular sieve materials. MMMs have received world-wide attention during the last two decades. In most cases, however, aggregation of the molecular sieve particles in the polymer matrix and poor adhesion at the interface of the molecular sieve particles and the polymer matrix results in poor mechanical and processing properties and poor permeation performance. Material compatibility and good adhesion between the polymer matrix and the molecular sieve particles are needed to achieve enhanced selectivity by the MMMs. Poor adhesion results in voids and defects larger than the pores inside the molecular sieves around the molecular sieve particles decrease the overall selectivity of the MMM by allowing the components needed to be separated to pass through the voids or defects without passing through the pores of the molecular sieves. Thus, these prior art MMMs can at most exhibit the selectivity of the continuous polymer matrix due to the voids and defects.

The present invention relates to high performance mixed matrix membranes (MMMs). More particularly, the invention relates to high performance MMMs incorporating at least two kinds of molecular sieves and methods for making and using these MMMs. The term "mixed matrix" as used in this invention means that the membrane comprises a continuous polymer matrix of one or more types of polymeric materials and at least two types of discrete molecular sieve particles uniformly dispersed throughout the continuous polymer matrix.

The present invention provides a method of making MMMs, particularly mixed matrix dense films, asymmetric flat sheet MMMs, thin-film composite MMMs, and asymmetric hollow fiber MMMs using concentrated suspensions (or a so-called "casting dope") containing at least two types of uniformly dispersed molecular sieves, solvents, and one or more types of polymers as the continuous polymer matrix. The method comprises first dispersing at least two types of molecular sieve particles in a solvent or a mixture of two or more solvents by ultrasonic mixing and/or mechanical stirring to form a slurry. Then a polymer is dissolved into the slurry. If desired, a second type of polymer is then dissolved into the slurry which is mixed sufficiently to form a concentrated suspension. A MMM is fabricated, usually as a dense film, an asymmetric flat sheet, thin-film composite, or hollow fiber MMM using the bubble free concentrated suspension. In some cases a membrane post-treatment step can be added to improve selectivity but not change or damage the membrane, or cause the membrane to lose performance with time. The membrane post-treatment step can be coating the top surface of the MMM with a thin layer of material such as a polysiloxane, a thermally curable silicone rubber, a fluoro-based polymer, or a radiation curable silicone to fill the surface voids and defects on the MMM.

Design of the best performing MMMs containing two or more kinds of uniformly dispersed molecular sieves in the continuous polymer matrix is based on the proper selection of the molecular sieves, the continuous polymer matrix, and the solvents used to dissolve the polymers.

The incorporation of two or more types of molecular sieve fillers into the continuous polymer matrix yields MMMs having a combination of higher permeability and higher selectivity over conventional polymer membranes for a variety of applications particularly for gas separations. The molecular sieves include microporous and mesoporous molecular sieves, carbon molecular sieves, and porous metal-organic frameworks (MOFs).

The function of one of the molecular sieve fillers is to improve the selectivity of the continuous polymer matrix in the MMMs (or to enhance both selectivity and permeability). These molecular sieves are believed to improve the performance of the MMM by providing selective holes/pores having an opening size that permits a gas such as carbon dioxide to pass through, but either not permitting another gas such as methane to pass through, or permitting it to pass through at a significantly slower rate. Therefore, this type of molecular sieve has higher selectivity for the desired separations such as separation of $CO_2$ and $CH_4$ than the original polymer. The addition of this type of molecular sieve enhances the performance of the mixed matrix membrane. To obtain the desired gas separation in the MMM, it is preferred that the steady-state permeability of the faster permeating gas component in the molecular sieves be at least equal to that of the faster permeating gas in the original polymer matrix phase. This type of molecular sieves can be selected from be microporous molecular sieves or carbon molecular sieves. Microporous molecular sieves have framework structures which may be characterized by distinctive wide-angle X-ray diffraction patterns. Microporous molecular sieve materials are microporous crystals with pores of a well-defined size ranging from 0.2 to 2 nm. This discrete porosity provides molecular sieving properties to these materials which have found wide applications as catalysts and sorption media. Zeolites are a subclass of microporous molecular sieves based on an aluminosilicate composition. Non-zeolitic molecular sieves are based on other compositions such as aluminophosphates, silico-aluminophosphates, and silica. Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Exemplary compositions of such small pore microporous alumina containing molecular sieves include non-zeolitic molecular sieves (NZMS) comprising certain aluminophosphates (AlPO's), silicoaluminophosphates (SAPO's), metallo-aluminophosphates (MeAPO's), elemental aluminophosphates (ElAPO's), metallo-silicoaluminophosphates (MeAPSO's) and elemental silicoaluminophosphates (ElAPSO's). Representative examples of microporous molecular sieves are small pore molecular sieves with a largest minor crystallographic free diameter of 3.8 angstroms or less such as SAPO-34, Si-DDR, UZM-9, AlPO-14, AlPO-53, AlPO-34, AlPO-17, SSZ-62, SSZ-13, AlPO-18, UZM-5, UZM-25, ERS-12, CDS-1, MCM-65, ZSM-52, MCM-47, 4A, AlPO-34, SAPO-44, SAPO-47, SAPO-17, CVX-7, SAPO-35, SAPO-56, AlPO-52, SAPO-43, medium pore molecular sieves such as silicalite-1, and large pore molecular sieves such as NaX, NaY, and CaY.

The function of the second type of molecular sieve fillers is to improve the permeability of the continuous polymer matrix in the MMMs (or enhance both selectivity and permeability). The second type of molecular sieve fillers can be selected from microporous molecular sieves, mesoporous molecular sieves, carbon molecular sieves, or porous metal-organic frameworks (MOFs). Examples of preferred mesoporous molecular sieve fillers include MCM-41, SBA-15, and surface functionalized MCM-41 and SBA-15, etc. MOFs are a new type of highly porous crystalline zeolite-like materials. MOFs are composed of rigid organic units assembled by metal-ligands and possess vast accessible surface areas. See Yaghi et al., SCIENCE, 295: 469 (2002); Yaghi et al., MICROPOR. MESOPOR. MATER., 73: 3 (2004); Dybtsev et al., ANGEW. CHEM. INT. ED., 43: 5033 (2004). MOF-5 is a prototype of a new class of porous materials constructed from octahedral Zn—O—C clusters and benzene links. Most recently, Yaghi et al. reported the systematic design and construction of a series of frameworks (IRMOF) that have structures based on the skeleton of MOF-5, wherein the pore functionality and size have been varied without changing the original cubic topology. For example, IRMOF-1 ($Zn_4O(R_1\text{-BDC})_3$) has the same topology as that of MOF-5, but was synthesized by a simplified method. In 2001, Yaghi et al. reported the synthesis of a porous metal-organic polyhedron (MOP) $Cu_{24}(m\text{-BDC})_{24}(DMF)_{14}(H_2O)_{50}(DMF)_6(C_2H_5OH)_6$, termed "α-MOP-1" and constructed from 12 paddle-wheel units bridged by m-BDC to give a large metal-carboxylate polyhedron. These MOF, IR-MOF and MOP materials exhibit analogous behaviour to that of conventional microporous materials such as having large and accessible surface areas with interconnected intrinsic micropores. Moreover, they may reduce the hydrocarbon fouling problem of the polyimide membranes due to the relatively larger pore sizes than those of zeolite materials. MOF, IR-MOF and MOP materials are also expected to allow the polymer to infiltrate the pores, which would improve the interfacial and mechanical properties and would in turn affect permeability. Therefore, these MOF, IR-MOF and MOP materials (all termed "MOF" herein this invention) may be used as the second type of molecular sieve fillers in the preparation of MMMs in the present invention.

The MMMs containing these at least two types of molecular sieve fillers exhibit simultaneously enhanced selectivity and permeability for separations compared to polymer membranes made from the continuous polymer matrix without addition of any molecular sieve fillers. Addition of small weight percents of two kinds of molecular sieves to the polymer matrix significantly increases the overall separation efficiency and productivity.

Preferably, the molecular sieves used in the present invention include microporous and mesoporous molecular sieves, carbon molecular sieves, and porous metal-organic frameworks (MOFs). More preferably, one of the molecular sieves used in the MMM of current invention is selected from microporous molecular sieves such as pure silicate molecular sieves including Si-DDR; alumino-phosphate molecular sieves including AlPO-14 and AlPO-53; aluminosilicate molecular sieves including UZM-5 and UZM-25; or silico-alumino-phosphate molecular sieves including SAPO-34. The other molecular sieve is selected from microporous molecular sieves such as alumino-phosphate molecular sieves including AlPO-18 and AlPO-17; aluminosilicate molecular sieves including 4A, 5A, SSZ-13, SSZ-62 and UZM-9; mesoporous molecular sieves such as MCM-41, MCM-48, and SBA-15, carbon molecular sieves, or MOFs. Most preferably, the two types of molecular sieves used in one MMM of current invention are selected from two different nano-sized (5-1000 nm particle size) small pore microporous molecular sieves and having a largest minor crystallographic free diameter of 3.8 angstroms or less such as AlPO-14 and AlPO-18 in one MMM, AlPO-14 and SAPO-34 in one MMM, AlPO-14 and UZM-5 in one MMM, or Si-DDR and AlPO-18 in one MMM.

The particle size of the molecular sieves dispersed in the continuous polymer matrix of the MMMs in the present invention should be small enough to form a uniform dispersion of the particles in the concentrated suspensions from which the MMMs will be fabricated. The median particle size should be less than about 10 µm, preferably less than 5 µm, and more preferably less than 1 µm. Most preferably, nano-molecular sieves (or "molecular sieve nanoparticles") should be used in the MMMs of the current invention.

Nano-molecular sieves as described herein are sub-micron size molecular sieves with particle sizes in the range of 5 to 1000 nm. Nano-molecular sieve selection for the preparation of MMMs includes screening the dispersity of the nano-molecular sieves in organic solvent, the porosity, particle size, and surface functionality of the nano-molecular sieves, the dispersity in the polymer solution, the adhesion or wetting property of the nano-molecular sieves with the polymer matrix. Nano-molecular sieves for the preparation of MMMs should have suitable pore size to allow selective permeation of a smaller sized gas, and also should have appropriate particle size in the nanometer range to prevent defects in the membranes. The nano-molecular sieves should be easily dispersed without agglomeration in the polymer matrix to maximize the transport property.

Representative examples of nano-molecular sieves suitable to be incorporated into the MMMs described herein include nano-silicalite-1, nano-SAPO-34, nano-Si-DDR, nano-AlPO-14, nano-AlPO-34, nano-AlPO-18, nano-AlPO-53, nano-SSZ-62, nano-UZM-9, nano-MCM-65, nano-UZM-5, nano-UZM-25, nano-ERS-12, nano-MCM-65, nano-ZSM-52, and nano-CDS-1.

The MMMs prepared by the current invention comprise two or more types of uniformly dispersed molecular sieve fillers throughout the continuous polymer matrix. The continuous polymer matrix contains one or two types of polymers. These polymers provide a wide range of properties important for separations, and modifying these properties can improve membrane selectivity. A material with a high glass transition temperature (Tg), high melting point, and high crystallinity is preferred for most gas separations. Glassy polymers (i.e., polymers below their Tg) have stiffer polymer backbones than other polymers and therefore allow smaller molecules such as hydrogen and helium to permeate the membrane more quickly and larger molecules such as hydrocarbons permeate the membrane more slowly.

For MMM applications it is preferred that the membrane fabricated from the pure polymer, which can be used as the continuous polymer matrix in MMMs, exhibits a carbon dioxide over methane selectivity of at least 8, more preferably at least 15 at 50° C. under 690 kPa (100 psig) pure carbon dioxide or methane pressure. Preferably, the polymers used as the continuous polymer matrix in the MMMs of the present invention are rigid, glassy polymers. Typical polymers suitable for MMM preparation as the continuous polymer matrix can be selected from, but are not limited to, polysulfones; sulfonated polysulfones; polyethersulfones (PESs); sulfonated PESs; polyethers; polyetherimides such as Ultem (or Ultem 1000) sold under the trademark Ultem®, manufactured by GE Plastics; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose; polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylate), poly(acrylate)s, and poly(phenylene terephthalate); polysulfides; polymers from monomers having alpha-olefinic unsaturation other than listed above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridine)s, poly(vinyl pyrrolidone)s, poly(vinyl ether)s, poly(vinyl ketone)s, poly(vinyl aldehyde)s such as poly(vinyl formal) and poly(vinyl butyral), poly(vinyl amide)s, poly(vinyl amine)s, poly(vinyl urethane)s, poly(vinyl urea)s, poly(vinyl phosphate)s, and poly(vinyl sulfate)s; polyallyls; poly(benzobenzimidazole)s; polyquinoxalines; polybenzothiazoles; polybenzoxazoles; polyhydrazides; polyoxadiazoles; polytriazoles; poly(benzimidazole)s; polycarbodiimides; polyphosphazines; microporous polymers; and interpolymers, including block interpolymers containing repeating units from the above such as interpolymers of acrylonitrile-vinyl bromide-sodium salt of para-sulfophenyl-methallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Some preferred polymers for use as the continuous polymer matrix include, but are not limited to, polysulfones, sulfonated polysulfones, polyethersulfones (PESs), sulfonated PESs, polyethers, polyetherimides such as Ultem (or Ultem 1000) sold under the trademark Ultem®, manufactured by GE Plastics, cellulosic polymers such as cellulose acetate and cellulose triacetate, polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamides; poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)); poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)); poly(3,3',4,4'-diphenylsulfone tetracarboxylic dianhydride-3,3',5,5'-tetramethyl-4,4'-methylene dianiline) (poly(DSDA-TMMDA)); poly(3,3',4,4'-benzophenone tetracarboxylic dianhydride-3,3',5,5'-tetramethyl-4,4'-methylene dianiline) (poly(BTDA-TMMDA)); poly(3,3',4,4'-diphenylsulfone tetracarboxylic dianhydride-pyromellitic dianhydride-3,3',5,5'-tetramethyl-4,4'-methylene dianiline) (poly(DSDA-PMDA-TMMDA)); poly[2,2'-bis-(3,4-dicarboxyphenyl)hexafluoropropane dianhydride-1,3-phenylenediamine] (poly(6FDA-m-PDA)); poly[2,2'-bis-(3,4-dicarboxyphenyl)hexafluoropropane dianhydride-1,3-phenylenediamine-3,5-diaminobenzoic acid)] (poly(6FDA-m-PDA-DABA)); poly[2,2'-bis-(3,4-dicarboxyphenyl) hexafluoropropane dianhydride-2,2-bis(3-amino-4-hydroxyphenyl)-hexafluoropropane] (poly(6FDA-bis-AP-AF); polyether ketones; and microporous polymers.

The most preferred polymers that can serve as the continuous polymer matrix include, but are not limited to, PES, sulfonated PES, polysulfone, sulfonated polysulfones, polyimides such as Matrimid®, P84®, poly(BTDA-PMDA-TMMDA), poly(BTDA-PMDA-ODPA-TMMDA), poly(DSDA-TMMDA), poly(BTDA-TMMDA), poly(6FDA-bis-AP-AF), poly(BTDA-bis-AP-AF), or poly(DSDA-PMDA-TMMDA), polyetherimides such as Ultem®, polybenzoxazoles, cellulose acetate, cellulose triacetate, and microporous polymers.

Microporous polymers (or as so-called "polymers of intrinsic microporosity") described herein are polymeric materials that possess microporosity that is intrinsic to their molecular structures. See McKeown, et al., CHEM. COMMUN., 2780 (2002); Budd, et al., ADV. MATER., 16:456 (2004); McKeown, et al., CHEM. EUR. J., 11:2610 (2005). This type of microporous polymers can be used as the continuous polymer matrix in MMMs in the current invention. The microporous polymers have rigid rod-like, randomly contorted structure to generate intrinsic microporosity. These microporous polymers exhibit analogous behavior to that of conventional microporous molecular sieve materials such as large and accessible surface areas, interconnected intrinsic micropores of less than 2 nm in size, as well as high chemical and thermal stability, but, in addition, possess properties of conventional polymers such as good solubility and easy processability. Moreover, these microporous polymers possess polyether polymer chains that have favorable interaction between carbon dioxide and the ethers.

The weight ratio of the total molecular sieves to the polymer(s) as the continuous polymer matrix in the MMMs of the current invention can be within a broad range from 1:100 (1 weight part of molecular sieves per 100 weight parts of the polymer(s) as the continuous polymer matrix) to 1:1 (100 weight parts of molecular sieves per 100 weight parts of the polymer(s) as the continuous polymer matrix) depending upon the properties sought as well as the dispersibility of the particular molecular sieves in the particular continuous polymer matrix. Preferably, the weight ratio of the total molecular sieves to the polymer(s) as the continuous polymer matrix in the MMMs of the current invention is in a range from 1:10 (10 weight part of molecular sieves per 100 weight parts of the polymer(s) as the continuous polymer matrix) to 1:2 (50 weight parts of molecular sieves per 100 weight parts of the polymer(s) as the continuous polymer matrix).

The weight ratio of the two kinds of molecular sieves a and b in the MMMs of the current invention can be within a broad range from 1:10 (1 weight part of molecular sieve a per 10 weight parts of molecular sieve b) to 10:1 (10 weight parts of molecular sieve a per 1 weight part of molecular sieve b) depending upon the properties sought as well as the dispersibility of the particular molecular sieves in the particular continuous polymer matrix. Preferably, the weight ratio of the two kinds of molecular sieves a and b in the MMMs of the current invention is within a range from 1:2 (1 weight part of molecular sieve a per 2 weight parts of molecular sieve b) to 2:1 (2 weight parts of molecular sieve a per 1 weight part of molecular sieve b).

The solvents used for dispersing the molecular sieve particles in the concentrated suspension and for dissolving the polymers as the continuous polymer matrix are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, THF, acetone, DMF, DMSO, toluene, dioxanes, 1,3-dioxolane, 1,4-dioxane, mixtures thereof, as well as other solvents known to those skilled in the art.

In the present invention, MMMs can be fabricated with various membrane structures such as mixed matrix dense films, flat sheet asymmetric MMMs, thin film composite MMMs, or hollow fiber asymmetric MMMs. These MMMs are made from the concentrated suspensions containing solvents, at least two types of molecular sieves, and one or more polymers. For example, the suspension can be sprayed, spin coated, poured into a sealed glass ring on top of a clean glass plate, or cast with a doctor knife. In another method, a porous substrate can be dip coated with the suspension. One solvent removal technique that can be used is the evaporation of volatile solvents by ventilating the atmosphere above the forming membrane with a dry gas and drawing a vacuum. Another solvent removal technique requires immersion of the cast thin layer of the concentrated suspension on a glass plate or on a porous or permeable substrate in a non-solvent for the polymers but is miscible with the solvents in the suspension. The substrate and/or the atmosphere or non-solvent into which the thin layer of dispersion is immersed can be heated to facilitate the removal of the solvents. When the MMM is substantially free of solvents, it can be detached from the glass plate to form a free-standing (or self-supporting) structure or the MMM can be left in contact with a porous or permeable support substrate to form an integral composite assembly. Additional fabrication steps that can be used include washing the MMM in a bath of an appropriate liquid to extract residual solvents and other foreign matters from the membrane, drying the washed MMM to remove residual liquid, and in some cases coating a thin layer of material such as a polysiloxane, a thermally curable silicone rubber, a fluoro-based polymer, or a radiation curable silicone to fill the surface voids and defects on the MMM.

One preferred embodiment of the MMMs in the current invention is in the form of an asymmetric structure for gas separation comprising a smooth thin dense selective layer on top of a highly porous supporting layer. In some cases of the preferred embodiment, the thin dense selective layer and the porous supporting layer are composed of the same molecular sieve/polymer mixed matrix material. In some other cases of the preferred embodiment, the thin dense selective layer is composed of the molecular sieve/polymer mixed matrix material and the porous supporting layer is composed of a pure polymer material or an inorganic material.

The method of the current invention for producing high performance MMMs is suitable for large scale membrane production and can be integrated into commercial polymer membrane manufacturing process. These MMMs, particularly dense film MMMs and asymmetric flat sheet MMMs, exhibit significantly enhanced selectivity and permeability over the polymer membranes prepared from the polymer matrix.

The invention provides a process for separating at least one gas from a mixture of gases using the MMMs described herein. The process comprises providing a mixed matrix gas separation membrane comprising at least two types of molecular sieve filler materials uniformly dispersed in a continuous polymer matrix phase consisting essentially of one or two polymers which are permeable to at least one gas. The mixture contacts one side of the MMM to cause at least one gas to permeate the MMM and then a permeate gas composition comprising a portion of said at least one gas which permeated the membrane is removed from the opposite side of the membrane.

These MMMs are suitable for a variety of gas, vapor, and liquid separations, and particularly suitable for gas and vapor separations such as separations of $CO_2/CH_4$, $H_2/CH_4$, $O_2/N_2$, $CO_2/N_2$, olefin/paraffin, and iso/normal paraffins.

The MMMs of the present invention are especially useful in the purification, separation or adsorption of particular species in the liquid or gas phase. In addition to separation of pairs of gases, these MMMs may be used for the separation of proteins or other thermally unstable compounds, e.g. in the pharmaceutical and biotechnology industries. The MMMs may also be used in fermenters and bioreactors to transport gases into the reaction vessel and transfer cell culture medium out of the vessel. Additionally, the MMMs may be used for the removal of microorganisms from air or water streams, water purification, ethanol production in a continuous fermentation/membrane pervaporation system, and in detection or removal of trace compounds or metal salts in air or water streams.

The MMMs are especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these MMMs may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The MMMs may incorporate a species that adsorbs strongly to certain gases (e.g. cobalt porphyrins or phthalocyanines for $O_2$ or silver (I) for ethane) to facilitate their transport across the membrane.

These MMMs may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Further liquid phase examples include the separation of one organic component from another organic component, e.g. to separate isomers of organic compounds. Mixtures of organic compounds which may be separated using these MMMs include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid. The MMMs may be used for gas separation. Examples of such separation include separation of an organic gas from an atmospheric gas, such as nitrogen or oxygen. A further example of such a separation is for the separation of carbon dioxide from natural gas. The MMMs may also be used for separation of organic molecules from water (e.g. ethanol and/or phenol from water by pervaporation) and removal of metal and other organic compounds from water. An additional application for the MMMs is in chemical reactors to enhance the yield of equilibrium-limited reactions by selective removal of a specific product in an analogous fashion to the use of hydrophilic membranes to enhance esterification yield by the removal of water.

The present invention pertains to high performance MMMs fabricated from stabilized concentrated suspensions containing uniformly dispersed at least two types of molecular sieves in a continuous polymer matrix. These new MMMs have immediate applications for the separation of gas mixtures including carbon dioxide removal from natural gas. MMM permits carbon dioxide to diffuse through at a faster rate than the methane in the natural gas. Carbon dioxide has higher permeation rate than methane because of higher solubility, higher diffusivity, or both. Thus, carbon dioxide enriches on the permeate side of the membrane, and methane enriches on the feed (or reject) side of the membrane.

Any given pair of gases that differ in size, for example nitrogen and oxygen, carbon dioxide and methane, hydrogen and methane or carbon monoxide, helium and methane, can be separated using the MMMs described herein. More than two gases can be removed from a third gas. For example, some of the components which can be selectively removed from a raw natural gas using the membranes described herein include carbon dioxide, oxygen, nitrogen, water vapor, hydrogen sulfide, helium, and other trace gases. Some of the components that can be selectively retained include hydrocarbon gases.

EXAMPLES

The following examples are provided to illustrate one or more preferred embodiments of the invention, but are not limited embodiments thereof. Numerous variations can be made to the following examples that lie within the scope of the invention.

Example 1

A "control" Matrimid-PES blend polymer membrane (abbreviated as C-P64 in Tables 1 and 2) was prepared by dissolving 12.0 g of Matrimid 5218 polyimide polymer (sold under the trademark Matrimid® by Huntsman Advanced Materials) and 8.0 g of polyethersulfone (PES, sold under the tradename ULTRASON E6010 Natural from BASF) in a mixture of 26.0 g of NMP and 54.0 g of 1,3-dioxolane by mechanical stirring. Then the mixture was stirred for 3 hours at room temperature to completely dissolve the polymers. The resulting homogeneous casting dope was allowed to degas overnight. A C-P64 blend polymer membrane was cast from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form C-P64.

Example 2

A "control" 30% AlPO-14/Matrimid-PES mixed matrix membrane (abbreviated as C-MMM1 in Tables 1 and 2) was prepared by first dispersing 3.0 g of AlPO-14 molecular sieves in a mixture of 13.0 g of NMP and 27.0 g of 1,3-dioxolane by mechanical stirring and ultrasonication to form a slurry. The slurry was stirred for 1 hour and then 1.5 g of polyethersulfone (PES, sold under the tradename ULTRASON E6010 Natural from BASF) was added to the slurry. The slurry was stirred for another 1 hour to completely dissolve PES polymer and then 2.0 g of PES as one part of the continuous polymer matrix was added. The mixture was further stirred for 2 hours to completely dissolve PES polymer and form a suspension. After that, 1.5 g of Matrimid 5218 polyimide polymer (sold under the trademark Matrimid® by Huntsman Advanced Materials) was added and it was dissolved in the suspension after stirring for 2 hours. Finally, 5.0 g of Matrimid 5218 polymer was added and it was dissolved in the suspension after stirring for 3 hours to form a concentrated suspension containing 30 wt-% of uniformly dispersed AlPO-14 molecular sieves (weight ratio of AlPO-14 to Matrimid and PES is 30:100) in the continuous Matrimid-PES blend polymer matrix. The concentrated suspension was allowed to degas overnight. C-MMM1 was cast on a clean glass plate from the bubble free stabilized concentrated suspension using a doctor knife with a 20-mil gap. The film together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form C-MMM1.

Example 3

A "control" 30% AlPO-18/Matrimid-PES mixed matrix membrane (abbreviated as C-MMM2 in Tables 1 and 2) was prepared using similar procedures as described in Example 2, but the molecular sieve used in this example is AlPO-18.

Example 4

A 20% AlPO-14-10% AlPO-18/Matrimid-PES mixed matrix membrane was (abbreviated as MMM1 in Tables 1 and 2) containing 20 wt-% of AlPO-14 molecular sieves and 10 wt-% of AlPO-18 molecular sieves in a blend polymer matrix of Matrimid and PES (AlPO-14/(Matrimid+PES)=30% by weight, AlPO-18/(Matrimid+PES)=10% by weight, Matrimid/PES=13:7) is prepared following similar procedures as described in Example 2, but the molecular sieves used in this example are AlPO-14 and AlPO-18.

Example 5

The $CO_2/CH_4$ separation properties of C-P64, C-MMM1, C-MMM2 and MMM1 were compared. The permeabilities ($P_{CO2}$ and $P_{CH4}$) and selectivity ($\alpha_{CO2/CH4}$) of C-P64 prepared in Example 1, C-MMM1 prepared in Example 2, C-MMM2 prepared in Example 3, and MMM1 prepared in Example 4 were measured by pure gas measurements at 50° C. under about 690 kPa pressure.

The results for $CO_2/CH_4$ separation are shown in Table 1. It can be seen from Table 1 that C-MMM1 mixed matrix membrane containing AlPO-14 molecular sieves and Matrimid polyimide and low cost PES blend polymer matrix (AlPO-14/(Matrimid+PES)=30 wt-%) showed $CO_2/CH_4$ selectivity increased by >20% without an increase in $CO_2$ permeability compared to C-P64 blend polymer membrane. The results in Table 1 also show that C-MMM2 mixed matrix membrane containing AlPO-18 molecular sieves and Matrimid polyimide and low cost PES blend polymer matrix (AlPO-18/(Matrimid+PES)=30 wt-%) showed about 250% increase in $CO_2$ permeability with a slight decrease in $CO_2/CH_4$ selectivity compared to C-P64 blend polymer membrane.

In order to improve $CO_2/CH_4$ selectivity and $CO_2$ permeability simultaneously, new MMM1 mixed matrix membrane containing both AlPO-14 and AlPO-18 molecular sieves and Matrimid polyimide and low cost PES blend polymer matrix ((AlPO-14+AlPO-18)/(Matrimid+PES)=30 wt-% and AlPO-14/AlPO-18=2:1) was prepared. The results in Table 1 show $CO_2/CH_4$ selectivity increased by >20% and simultaneous $CO_2$ permeability increased by >60% for $CO_2/CH_4$ separation ($P_{CO2}$=11.7 barrers, $\alpha_{CO2/CH4}$=30.8) for MMM1 compared to C-P64 ($P_{CO2}$=7.16 barrers, $\alpha_{CO2/CH4}$=25.1). These results suggested that AlPO-14 molecular sieve fillers in MMM1 of the present invention improved the selectivity of the continuous Matrimid-PES blend polymer matrix and AlPO-18 molecular sieve fillers in MMM1 enhanced the permeability of the matrix for $CO_2/CH_4$ separation.

TABLE 1

Pure gas permeation test results of C-P64, C-MMM1, C-MMM2 and MMM1 for $CO_2/CH_4$ separation[a]

| Dense film | $P_{CO2}$ (Barrer) | $P_{CO2}$ increase (Barrer) | $\alpha_{CO2/CH4}$ | $\alpha_{CO2/CH4}$ increase |
|---|---|---|---|---|
| C-P64 | 7.16 | 0 | 25.1 | 0 |
| C-MMM1 | 6.56 | −8% | 30.5 | 21.5% |
| C-MMM2 | 25.0 | 249% | 21.4 | −14.7% |
| MMM1 | 11.7 | 63% | 30.8 | 22.7% |

[a]Tested at 50° C. under 690 kPa (100 psig) pure gas pressure.
[b]1 Barrer = $10^{-10}$ cm$^3$(STP) · cm/cm$^2$ · sec · cmHg.

Example 6

$H_2/CH_4$ separation properties of C-P64, C-MMM1, C-MMM2 and MMM1 were compared. The permeabilities ($P_{H2}$ and $P_{CH4}$) and selectivity ($\alpha_{H2/CH4}$) of C-P64 prepared in Example 1, C-MMM1 prepared in Example 2, C-MMM2 prepared in Example 3, and MMM1 prepared in Example 4 were measured by pure gas measurements at 50° C. under about 690 kPa pressure.

The results for $H_2/CH_4$ separation are shown in Table 2. It can be seen from Table 2 that C-MMM1 mixed matrix membrane containing AlPO-14 molecular sieves and Matrimid polyimide and low cost PES blend polymer matrix (AlPO-14/(Matrimid+PES)=30 wt-%) showed $H_2/CH_4$ selectivity increased by 45% without significant increase in $H_2$ permeability compared to C-P64 blend polymer membrane. The results in Table 2 also show that C-MMM2 mixed matrix membrane containing AlPO-18 molecular sieves and similar blend polymer matrix (AlPO-18/(Matrimid+PES)=30 wt-%)

showed about a 200% increase in $H_2$ permeability with a 27% decrease in $H_2/CH_4$ selectivity compared to C-P64 blend polymer membrane.

In order to improve $H_2/CH_4$ selectivity and $H_2$ permeability simultaneously, new MMM1 mixed matrix membrane containing both AlPO-14 and AlPO-18 molecular sieves and Matrimid polyimide and low cost PES blend polymer matrix ((AlPO-14+AlPO-18)/(Matrimid+PES)=30 wt-% and AlPO-14/AlPO-18=2:1) was prepared. The results in Table 2 show $H_2/CH_4$ selectivity increased by 29% and simultaneous $H_2$ permeability increased by >70% for $H_2/CH_4$ separation ($P_{H2}$=34.4 barrers, $\alpha_{H2/CH4}$=90.5) for MMM1 compared to C-P64 blend polymer membrane ($P_{CO2}$=7.16 barrers, $\alpha_{CO2/CH4}$=25.1). These results suggested that AlPO-14 molecular sieve fillers in the new MMM1 mixed matrix membrane of the present invention improved the selectivity of the continuous Matrimid-PES blend polymer matrix and AlPO-18 molecular sieve fillers in the membrane enhanced the permeability of the matrix for $H_2/CH_4$ separation.

TABLE 2

Pure gas permeation test results of C-P64, C-MMM1, C-MMM2 and MMM1 for $H_2/CH_4$ separation[a]

| Dense film | $P_{H2}$ (Barrer) | $P_{H2}$ increase (Barrer) | $\alpha_{H2/CH4}$ | $\alpha_{H2/CH4}$ increase |
|---|---|---|---|---|
| C-P64 | 19.9 | 0 | 70.0 | 0 |
| C-MMM1 | 21.9 | 10% | 101.7 | 45.3% |
| C-MMM2 | 59.4 | 198% | 50.8 | −27.4% |
| MMM1 | 34.4 | 73% | 90.5 | 29.3% |

[a]Tested at 50° C. under 690 kPa (100 psig) pure gas pressure.
[b]1 Barrer = $10^{-10}$ $cm^3$(STP)·cm/$cm^2$·sec·cmHg.

Example 7

A "control" poly(DSDA-TMMDA)-PES polymer membrane (abbreviated as C-P91 in Tables 3 and 4) was prepared using similar procedures as described in Example 1, but the polymers used in this example are poly(DSDA-TMMDA) polyimide polymer and polyethersulfone (PES) (poly (DSDA-TMMDA):PES=9:1 weight ratio).

Example 8

A "control" 20% AlPO-14/poly(DSDA-TMMDA)-PES mixed matrix membrane containing 20 wt-% of dispersed AlPO-14 molecular sieve particles in poly(DSDA-TMMDA) polyimide and PES blend continuous polymer matrix (abbreviated as C-MMM20 in Tables 3 and 4) was prepared using similar procedures as described in Example 2.

Example 9

A "control" 20% AlPO-18/poly(DSDA-TMMDA)-PES mixed matrix membrane containing 20 wt-% of dispersed AlPO-18 molecular sieve particles in poly(DSDA-TMMDA) polyimide and PES blend continuous polymer matrix (abbreviated as C-MMM21 in Table 3) was prepared using similar procedures as described in Example 2 but the molecular sieve used in this example is AlPO-18.

Example 10

A 20% AlPO-14-20% AlPO-18/poly(DSDA-TMMDA)-PES mixed matrix membrane containing 20 wt-% of dispersed AlPO-14 and 20 wt-% of dispersed AlPO-18 molecular sieve particles in poly(DSDA-TMMDA) polyimide and PES blend continuous polymer matrix (abbreviated as MMM22 in Table 3) was prepared using similar procedures as described in Example 4.

Example 11

A "control" 20% UZM-5/poly(DSDA-TMMDA)-PES mixed matrix membrane containing 20 wt-% of dispersed UZM-5 zeolite particles in poly(DSDA-TMMDA) polyimide and PES blend continuous polymer matrix (abbreviated as C-MMM23 in Table 4) was prepared using similar procedures as described in Example 8 but the molecular sieve used in this example is UZM-5.

Example 12

A 20% AlPO-14-20% UZM-5/poly(DSDA-TMMDA)-PES mixed matrix membrane containing 20 wt-% of dispersed AlPO-14 and 20 wt-% of dispersed UZM-5 molecular sieve particles in poly(DSDA-TMMDA) polyimide and PES blend continuous polymer matrix (abbreviated as MMM24 in Table 4) was prepared using similar procedures as described in Example 10 but the molecular sieves used in this example are AlPO-14 and UZM-5.

Example 13

$CO_2/CH_4$ separation properties of C-P91, C-MMM20, C-MMM21, and MMM22 membranes were compared. The permeabilities ($P_{CO2}$ and $P_{CH4}$) and selectivity ($\alpha_{CO2/CH4}$) of C-P91 blend polymer membrane prepared in Example 7, C-MMM20 mixed matrix membrane prepared in Example 8, C-MMM21 mixed matrix membrane prepared in Example 9, and MMM22 prepared in Example 10 were measured by pure gas measurements at 50° C. under about 690 kPa pressure.

The results for $CO_2/CH_4$ separation are shown in Table 3. It can be seen from Table 3 that the "control" C-MMM20 mixed matrix membrane containing 20 wt-% of AlPO-14 molecular sieves in poly(DSDA-TMMDA) polyimide and PES blend continuous polymer matrix (AlPO-14/(poly(DSDA-TMMDA)+PES)=20 wt-%) showed $CO_2/CH_4$ selectivity increase by 23% and $CO_2$ permeability increase by 30% compared to the "control" C-P91 blend polymer membrane without molecular sieves. The results in Table 3 also show that the "control" C-MMM21 mixed matrix membrane containing 20 wt-% of AlPO-18 molecular sieves in poly(DSDA-TMMDA) polyimide and PES blend continuous polymer matrix (AlPO-18/(poly(DSDA-TMMDA)+PES)=20 wt-%) showed 96% increase in $CO_2$ permeability with maintained $CO_2/CH_4$ selectivity compared to the "control" C-P91 blend polymer membrane without molecular sieves.

To achieve higher than 100% increase in $CO_2$ permeability and higher than 20% increase in $CO_2/CH_4$ selectivity simultaneously, a new MMM22 mixed matrix membrane containing a mixture of AlPO-14 and AlPO-18 molecular sieves in poly(DSDA-TMMDA) polyimide and PES blend continuous polymer matrix (AlPO-14/(poly(DSDA-TMMDA)+PES)=20 wt-% and AlPO-18/(poly(DSDA-TMMDA)+PES)=20 wt-%) was prepared. The results for this MMM22 membrane in Table 3 show that $CO_2/CH_4$ selectivity increase by 23% and simultaneous $CO_2$ permeability increase by 115% compared to C-P91 blend polymer membrane. The $CO_2/CH_4$ separation performance including both $CO_2$ permeability and $CO_2/CH_4$ selectivity of the MMM22 mixed matrix membrane is superior to those of C-MMM20 and C-MMM21. These results suggested that AlPO-18 molecular sieves in the new MMM22 mixed matrix membrane of the present invention contributes to the enhancement of $CO_2$ permeability of the continuous blend polymer matrix and AlPO-14 molecular sieves in MMM22 contributes to both the improvement of $CO_2$ permeability and $CO_2/CH_4$ selectivity.

TABLE 3

Pure gas permeation test results of C-P91, C-MMM20, C-MMM21, and MMM22 membranes for $CO_2/CH_4$ separation[a]

| Dense film | $P_{CO2}$ (Barrer) | $P_{CO2}$ increase (Barrer) | $\alpha_{CO2/CH4}$ | $\alpha_{CO2/CH4}$ increase |
|---|---|---|---|---|
| C-P91 | 18.5 | 0 | 24.8 | 0 |
| C-MMM20 | 24.0 | 30% | 30.5 | 23% |
| C-MMM21 | 36.2 | 96% | 25.3 | 0 |
| MMM22 | 39.8 | 115% | 30.4 | 23% |

[a]Tested at 50° C. under 690 kPa (100 psig) pure gas pressure.
[b]1 Barrer = $10^{-10}$ cm$^3$(STP) · cm/cm$^2$ · sec · cmHg.

Example 14

$CO_2/CH_4$ separation properties of C-P91, C-MMM20, C-MMM23, and MMM24 membranes were prepared. The permeabilities ($P_{CO2}$ and $P_{CH4}$) and selectivity ($\alpha_{CO2/CH4}$) of C-P91 blend polymer membrane prepared in Example 7, C-MMM20 mixed matrix membrane prepared in Example 8, C-MMM23 mixed matrix membrane prepared in Example 11, and MMM24 prepared in Example 12 were measured by pure gas measurements at 50° C. under about 690 kPa pressure.

The results for $CO_2/CH_4$ separation are shown in Table 4. It can be seen from Table 4 that the "control" C-MMM20 mixed matrix membrane containing 20 wt-% of AlPO-14 molecular sieves in poly(DSDA-TMMDA) polyimide and PES blend continuous polymer matrix (AlPO-14/(poly(DSDA-TMMDA)+PES)=20 wt-%) showed $CO_2/CH_4$ selectivity increase by 23% and $CO_2$ permeability increase by 30% compared to the "control" C-P91 blend polymer membrane without molecular sieves. The results in Table 4 also show that the "control" C-MMM23 mixed matrix membrane containing 20 wt-% of UZM-5 zeolites in poly(DSDA-TMMDA) polyimide and PES blend continuous polymer matrix (UZM-5/(poly(DSDA-TMMDA)+PES)=20 wt-%) showed 84% increase in $CO_2$ permeability and 9% increase in $CO_2/CH_4$ selectivity compared to the "control" C-P91 blend polymer membrane without molecular sieves.

To achieve higher than 100% increase in $CO_2$ permeability and higher than 20% increase in $CO_2/CH_4$ selectivity simultaneously, a new MMM24 mixed matrix membrane containing a mixture of AlPO-14 and UZM-5 molecular sieves in poly(DSDA-TMMDA) polyimide and PES blend continuous polymer matrix (AlPO-14/(poly(DSDA-TMMDA)+PES)=20 wt-% and UZM-5/(poly(DSDA-TMMDA)+PES)=20 wt-%) was prepared. The results for this MMM24 membrane in Table 4 show that $CO_2/CH_4$ selectivity increase by 29% and simultaneous $CO_2$ permeability increase by 121% compared to C-P91 blend polymer membrane. The $CO_2/CH_4$ separation performance including both $CO_2$ permeability and $CO_2/CH_4$ selectivity of the MMM24 mixed matrix membrane is superior to those of C-MMM20 and C-MMM23. These results suggested that UZM-5 molecular sieves in the new MMM24 mixed matrix membrane of the present invention mainly contributes to the enhancement of $CO_2$ permeability of the continuous blend polymer matrix and AlPO-14 molecular sieves in MMM22 mainly contributes to the improvement of $CO_2/CH_4$ selectivity.

TABLE 4

Pure gas permeation test results of C-P91, C-MMM20, C-MMM23, and MMM24 membranes for $CO_2/CH_4$ separation[a]

| Dense film | $P_{CO2}$ (Barrer) | $P_{CO2}$ increase (Barrer) | $\alpha_{CO2/CH4}$ | $\alpha_{CO2/CH4}$ increase |
|---|---|---|---|---|
| C-P91 | 18.5 | 0 | 24.8 | 0 |
| C-MMM20 | 24.0 | 30% | 30.5 | 23% |
| C-MMM23 | 34.1 | 84% | 27.1 | 9% |
| MMM24 | 40.8 | 121% | 31.9 | 29% |

[a]Tested at 50° C. under 690 kPa (100 psig) pure gas pressure.
[b]1 Barrer = $10^{-10}$ cm$^3$(STP) · cm/cm$^2$ · sec · cmHg.

The invention claimed is:

1. A mixed matrix membrane comprising at least two types of molecular sieves having, independently, a largest minor crystallographic free diameter of 3.8 angstroms or less dispersed in a continuous polymer matrix wherein said at least two types of molecular sieves are selected to produce a mixed matrix membrane having improved $CO_2/CH_4$ selectivity and $CO_2$ permeability wherein a first type of molecular sieve is AlPO-14 and a second type of molecular sieve has a largest minor crystallographic free diameter of its pores of 3.8 angstroms or less.

2. The mixed matrix membrane of claim 1 wherein said second type of molecular sieves is selected from the group consisting of pure silicate molecular sieves, alumino-phosphate molecular sieves; aluminosilicate molecular sieves and silico-alumino-phosphate molecular sieves.

3. The mixed matrix membrane of claim 2 wherein said pure silicate molecular sieve is Si-DDR, said alumino-phosphate molecular sieves are selected from the group consisting of AlPO-18, AlPO-34, AlPO-53, and AlPO-17, said aluminosilicate molecular sieves are selected from the group consisting of 4A, SSZ-13, SSZ-62, UZM-5, UZM-25, and UZM-9, and said silico-alumino-phosphate molecular sieve is SAPO-34.

4. The mixed matrix membrane of claim 1 wherein said continuous polymer matrix comprises one or more rigid, glassy polymers.

5. The mixed matrix membrane of claim 4 wherein said rigid glassy polymers are selected from the group consisting of polysulfones; sulfonated polysulfones; polyethersulfones; sulfonated polyethersulfones; cellulosic polymers including cellulose acetate and cellulose triacetate; polyamides; polyimides; polyamide/imides; polyketones; polyether ketones; polyether ether ketones; poly(arylene oxide)s; poly(esteramide-diisocyanate)s; polyurethanes; polyesters; polybenzobenzimidazoles; polybenzimidazoles; polybenzoxozoles; polycarbodiimides; polyphosphazines; microporous polymers wherein said microporous polymers have rigid rod-like, randomly contorted structures; and blends thereof.

6. The mixed matrix membrane of claim 2 wherein said AlPO-14 and said second type of molecular sieve are present at a ratio by weight of from 1:2 to 2:1.

7. The mixed matrix membrane of claim 1 wherein said mixed matrix membrane is a mixed matrix dense film, a flat sheet asymmetric mixed matrix membrane, a thin film composite mixed matrix membrane or a hollow fiber asymmetric mixed matrix membrane.

8. A method of making a mixed matrix membrane comprising dispersing AlPO-14 and a second type of molecular sieve particles in one or more solvents to form a slurry, dissolving a polymer as a continuous polymer matrix in said slurry to form a concentrated suspension, and then fabricating a mixed matrix membrane from said concentrated suspension wherein said second type of molecular sieves are selected, from the group consisting of SAPO-34, Si-DDR, UZM-9, AlPO-14, AlPO-53, AlPO-34, AlPO-17, SSZ-62, SSZ-13, AlPO-18, UZM-5, UZM-25, ERS-12, CDS-1, MCM-65, ZSM-52, and MCM-47, 4A, to produce a mixed matrix membrane having improved $CO_2/CH_4$ selectivity and $CO_2$ permeability.

9. The method of claim 8 further comprising dissolving a second polymer into said slurry.

10. The method of claim 8 further comprising coating a top surface of said mixed matrix membrane with a thin layer of a material to fill in any surface voids or defects.

11. The method of claim 10 wherein said thin layer of material is selected from the group consisting of a polysiloxane, a thermally curable silicone rubber, a fluoro-based polymer, or a radiation curable silicone.

12. The method of claim 8 wherein said AlPO-14 and said second type of molecular sieve are present at a ratio by weight of from 1:2 to 2:1.

13. The method of claim 8 wherein said continuous polymer matrix comprises one or more rigid, glassy polymers.

14. The method of claim 13 wherein said rigid glassy polymers are selected from the group consisting of polysulfones; sulfonated polysulfones; polyethersulfones; sulfonated polyethersulfones; cellulosic polymers including cellulose acetate and cellulose triacetate; polyamides; polyimides; polyamide/imides; polyketones; polyether ketones; polyether ether ketones; poly(arylene oxide)s; poly(esteramide-diisocyanate)s; polyurethanes; polyesters; polybenzobenzimidazoles; polybenzimidazoles; polybenzoxazoles; polycarbodiimides; polyphosphazines; microporous polymers wherein said microporous polymers have rigid rod-like, randomly contorted structures; and blends thereof.

15. A process to separate at least one gas from a mixture of gases comprising providing a mixed matrix gas separation membrane comprising at least two types of molecular sieves comprising AlPO-14 and a second type of molecular sieve with a largest minor crystallographic free diameter of 3.8 angstroms or less dispersed in a continuous polymer matrix wherein said mixture of gases contacts one side of said mixed matrix gas separation membrane to cause at least one gas to permeate the mixed matrix gas separation membrane and then to remove said at least one gas which permeated the membrane while at least one other gas does not permeate the mixed matrix gas separation membrane.

16. The process of claim 15 wherein said second type of molecular sieves is selected, from the group consisting of pure silicate molecular sieves, alumino-phosphate molecular sieves; aluminosilicate molecular sieves and silico-alumino-phosphate molecular sieves.

17. The process of claim 15 wherein said mixture of gases is selected from pairs of gases comprising $CO_2/CH_4$, $H_2/CH_4$, $O_2/N_2$, $CO_2/N_2$, olefin/paraffin, and iso/normal paraffins.

18. The mixed matrix membrane of claim 1 wherein said second type of molecular sieves is selected, from the group consisting of SAPO-34, Si-DDR, UZM-9, AlPO-14, AlPO-53, AlPO-34, AlPO-17, SSZ-62, SSZ-13, ALPO-18, UZM-5, UZM-25, ERS-12, CDS-1, MCM-65, ZSM-52, and MCM-47, 4A.

19. The process of claim 15 wherein said mixture of gases comprises $CO_2$ and $CH_4$.

* * * * *